United States Patent [19]
Derenthal

[11] Patent Number: 5,571,404
[45] Date of Patent: Nov. 5, 1996

[54] BELT FILTER WITH MEANS TO ADVANCE THE BELT RESPONSIVE TO A CAPACITANCE SIGNAL

[75] Inventor: Ulrich Derenthal, Bad Kreuznach, Germany

[73] Assignee: Pannevis B.V., Netherlands

[21] Appl. No.: 332,823

[22] Filed: Oct. 31, 1994

Related U.S. Application Data

[63] Continuation-in-part of PCT/EP93/01070 Apr. 28, 1993.

[51] Int. Cl.$^6$ ................................................. B01D 33/04
[52] U.S. Cl. ........................... 210/97; 210/400; 210/406; 210/746; 210/783
[58] Field of Search .................................. 210/400, 406, 210/103, 97, 746, 783

[56] References Cited

U.S. PATENT DOCUMENTS

| | | | |
|---|---|---|---|
| 3,344,921 | 10/1967 | Fegan, Jr. | 210/746 |
| 4,038,193 | 7/1977 | Oosten | 210/400 |
| 4,543,191 | 9/1985 | Stewart et al. | 210/746 |
| 4,624,742 | 11/1986 | Klein et al. | 210/746 |
| 4,820,425 | 4/1989 | Telfer | 210/746 |
| 5,133,872 | 7/1992 | Baldwin et al. | 210/746 |
| 5,202,016 | 4/1993 | Church et al. | 210/746 |
| 5,221,467 | 6/1993 | Suzuki et al. | 210/85 |
| 5,462,677 | 10/1995 | Benesi | 210/791 |

FOREIGN PATENT DOCUMENTS

| | | | |
|---|---|---|---|
| 0316997 | 7/1992 | European Pat. Off. | B01D 37/04 |
| 7239703 | 3/1974 | France | B01D 33/00 |
| 4117682 | 12/1991 | Germany | B01D 29/00 |
| 2254812 | 11/1987 | Japan . | |
| 1670562 | 8/1991 | U.S.S.R. | G01N 27/22 |
| 2113563 | 8/1983 | United Kingdom | B01D 37/04 |

*Primary Examiner*—Robert J. Popovics
*Attorney, Agent, or Firm*—Webb Ziesenheim Bruening Logsdon Orkin & Hanson, P.C.

[57] ABSTRACT

The present invention provides an apparatus for separating into solid material and liquid a mixture thereof. The apparatus includes a movable filtering element for filtering the mixture, a feed device for supplying the mixture onto the filtering element, a suction device for drawing off liquid from the mixture through the filtering element and a measuring device for measuring the area or areas on the filtering element where the liquid is predominantly to be found.

8 Claims, 2 Drawing Sheets

BELT FILTER WITH MEANS TO ADVANCE THE BELT RESPONSIVE TO A CAPACITANCE SIGNAL

This application is a continuation-in-part of International Patent Application No. PCT/EP93/01070, filed 28th Apr. 1993, and published 11th Nov. 1993 and designating inter alia the United States of America.

BACKGROUND OF THE INVENTION

Apparatuses for separating a mixture into solid material and liquid which make use of movable filtering means are known in the art. So-called horizontal belt filters and drum filters as well as so-called tilting pan or table filters are, for instance, known for specific applications, in particular for chemical processes, and washing processes are also carried out on movable filtering means, for instance, for washing out an acidic solvent from which plastic granules have formed.

Two types of apparatuses for separating into solid material and liquid a mixture thereof are commercially available. The first type is an apparatus provided with a reciprocally movable suction box disposed beneath an endless movable filter cloth. Here an extremely good seal is obtained between the suction box and the filter cloth so that the liquid is drawn out of the mixture with sufficient suction force. The second type relates to an apparatus provided with a belt of sealing material such as rubber moving along with the endless filter cloth.

In the above stated types of separating apparatuses, it is important to have the separation take place as efficiently and optimally as possible. Because the composition of the mixture can vary during the separating process, the quantity of liquid on the cake of solid material changes. At the beginning and end of separating steps, possibly different liquid may be mixed together. In practice, samples are usually taken from the solid material remaining behind on the movable filtering means in order to establish whether separating and/or washing has taken place to a sufficient extent.

European Patent Application EP-A-0316997 describes a method and system for monitoring and/or controlling a liquid solid separation process. The process describes use of four photo-detectors in a gravity dewatering zone of a belt filter press.

European Patent Application DE-A-4117682 describes controlling the speed of movement of filtering means which are moved from one roll to another, driven by a motor.

The present invention has for its object to optimize the above stated separating process and separating apparatus, that is, to impose and maintain the quality standard requirements for the solid material and liquid for disposal.

SUMMARY OF THE INVENTION

The present invention provides an apparatus for separating into solid material and liquid a mixture thereof, comprising:

movable filtering means for filtering the mixture;

feed means for supplying the mixture onto the filtering means;

suction means for drawing off liquid from the mixture through the filtering means; and measuring means for measuring that area on the filtering means where the liquid is predominantly to be found.

In addition, the present invention provides an apparatus for washing solid material, comprising:

movable filtering means on which the solid material is present;

feed means for supplying liquid onto the filtering means;

suction means for drawing off liquid from the mixture through the filtering means; and measuring means for measuring that area on the filtering means where the liquid is predominantly to be found.

The size of the liquid pool is preferably kept as constant as possible by coupling the measuring means to a control means, for instance, for controlling the speed of movement of the filter cloth.

Although the control can also take place manually, a more uniform composition is usually obtained if this takes place automatically using the control means. It is also conceivable to couple the control means to the feed means for supplying the mixture and/or the washing liquid, to the suction means and/or to a fan for feeding dry air for drying the solid material if such a fan is present, whether or not in combination with the moving means.

The degree of suction brought about by the suction means is in any case dependent on the thickness and composition of the cake of solid material. The measuring means are preferably formed by a capacitive sensor which provides sufficiently accurate measurement results. It will be apparent that the present invention is however not limited to such a capacitive sensor.

Further advantages, features and details of the present invention will become apparent in the light of a description of the preferred embodiments thereof, wherein reference is made to the annexed figures.

DESCRIPTION OF THE PREFERRED EMBODIMENTS

Figure 1:
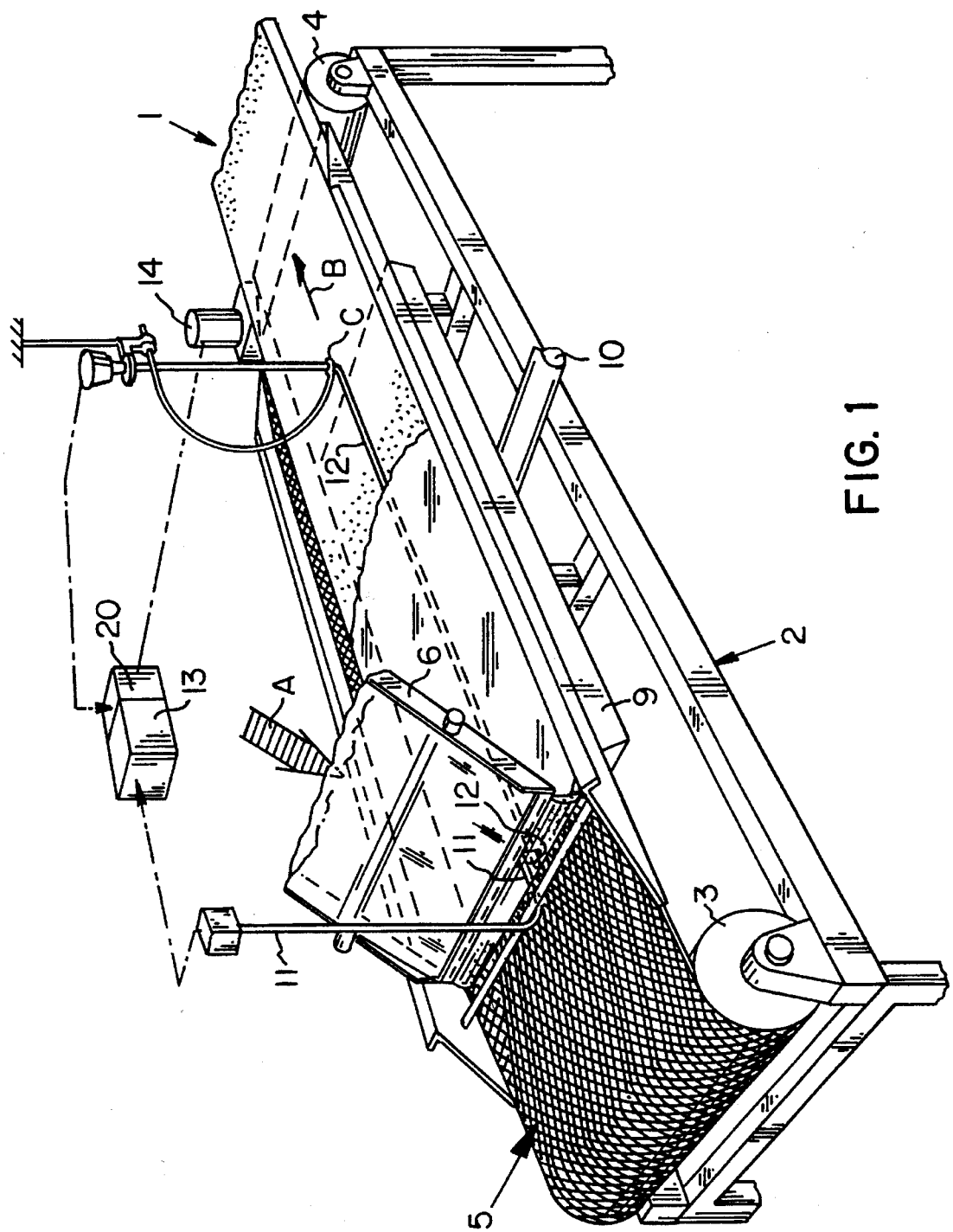
FIG. 1 is a broken isometric view of a first embodiment of a separating apparatus.
Figure 2:
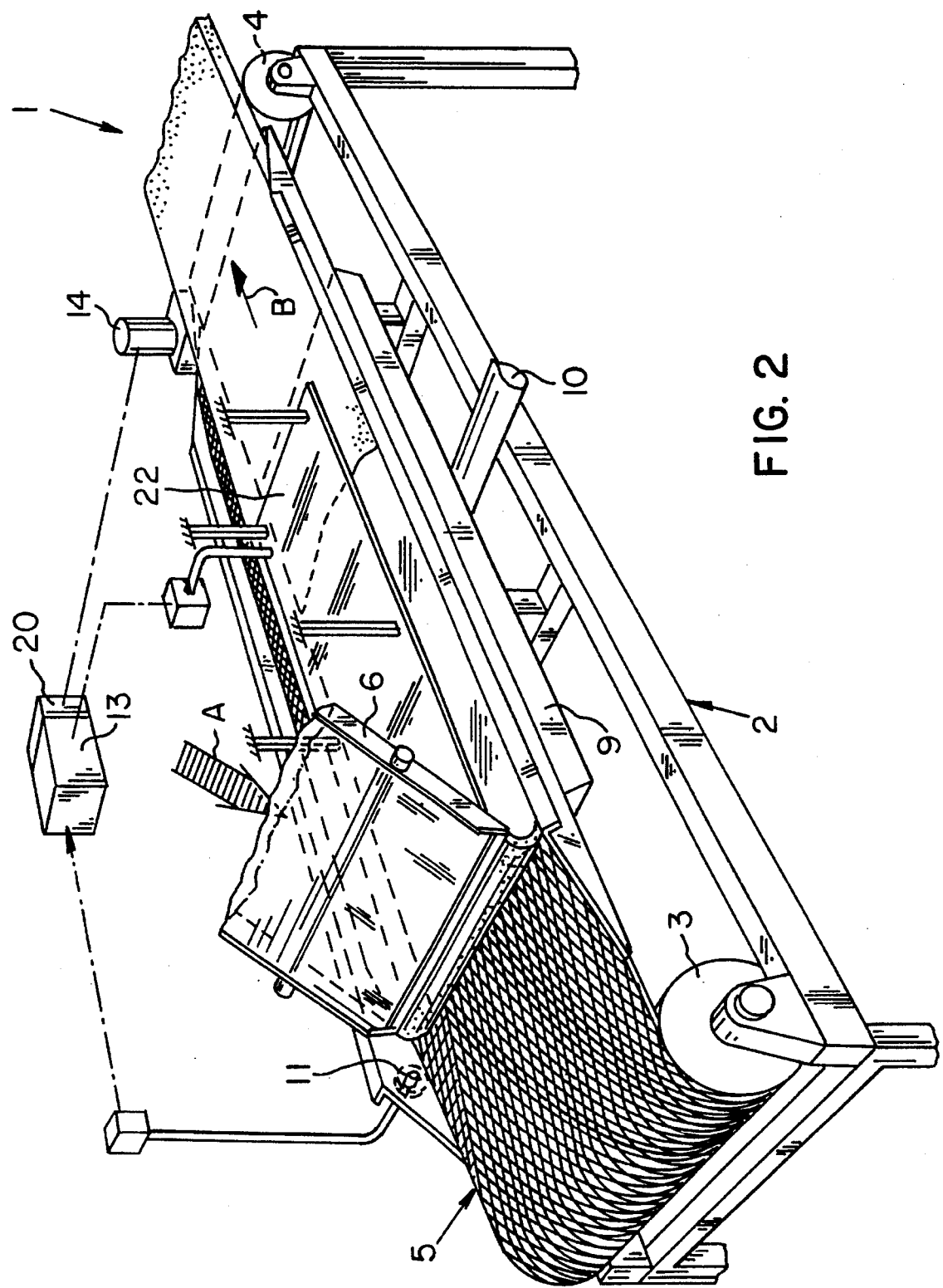
FIG. 2 is a broken isometric view of a second embodiment of the separating apparatus.

An apparatus of the present invention is generally designated 1 in FIGS. 1 and 2. A first embodiment of the apparatus, as shown in FIG. 1, comprises a frame 2 to which rollers 3, 4 are rotatably mounted at each end for guiding an endless filter cloth 5 around the rollers 3, 4. A mixture of solid material and liquid is carried in the direction of arrow A onto the filter cloth 5 along a feed plate 6 disposed at an incline. The solid material from the mixture will usually fall directly onto the filter cloth 5, while the liquid comes to lie above the solid material. The filter cloth 5 is guided over a grid under which is situated a reciprocally movable suction box 9. A suction line 10 is connected to the suction box 9 by which the liquid is sucked out of the mixture through the cake of solid material, through the filter cloth 5 and through the grid.

The apparatus is further provided with a measuring device which in the embodiment shown in FIG. 1 comprises a capacitive sensor including a first electrode in the form of an electrical conductor 11 arranged close to the feed plate 6 and a second electrode in the form of an insulated conductor 12 which extends from the area of the feed plate 6 to a predetermined position C at a distance from the feed plate 6 in the direction of arrow B, that is, in the direction of movement of the filter cloth. Also, because the separating apparatus 1 will usually be disposed at a slight incline, the liquid "pool" lies mainly above the cake of solid material in the area close to the feed plate 6 and the edge of the pool moves between feed plate 6 and point C. A displacement of the edge of the pool of liquid takes place when there are changes in the composition of the supplied mixture.

As shown schematically in FIG. 1, the electrodes 11 and 12 are connected to a measuring apparatus 13 likewise forming part of the measuring device. Preferably also included in the measuring apparatus 13 is a control device 20 which, as also shown schematically, is coupled to a drive device 14 for driving one of the rollers which determine the speed of movement of the filter cloth. The degree of filtration can be held as constant as possible by adjusting this speed of movement, that is, the edge of the liquid pool can be kept at a roughly constant position between the position of feed plate 6 and point C. It is noted that the fixing of the electrodes 11 and 12 is shown highly schematically in FIG. 1, since many variations are conceivable here.

An alternative embodiment of the apparatus 1 is shown in FIG. 2. The embodiment shown in FIG. 2 differs from the embodiment shown in FIG. 1 only in the design of the measuring device. As shown in FIG. 2, the first electrode 11 is formed by a connection to a side wall of the suction box 9. Alternatively, the first electrode 11 can be connected to the frame 2. The second electrode 12 includes a flat, plate-like member 22 which extends above and substantially parallel to the mixture carried on the filter cloth 5. Electrodes 11 and 12 are attached to measuring apparatus 13 in a similar manner to the embodiment shown in FIG. 1.

The present invention is not limited to the embodiments shown and described. If, for instance, means for determining the thickness of the layer of solid material are also arranged in a manner not shown, all conceivable parameters of the solid material can be determined and applied to the controlling of the filtering process. The most important parameters are: grain size, grain size distribution, grain shape and grain structure and viscosity.

Another not restricting variation relative to the embodiments shown is the position of the capacitive sensor, which can be on, above, or under the expected level of the liquid.

The rights applied for are defined in the annexed claims.

I claim:

1. An apparatus for separating into solid material and liquid a mixture thereof, comprising:

movable belt filtering means for filtering the mixture;

feed means for supplying the mixture onto said belt filtering means;

suction means for drawing off liquid from the mixture through said belt filtering means; and measuring means for continuously measuring a position of an edge of a liquid pool on said belt filtering means, said measuring means comprising a capacitive sensor extending substantially along an upper surface of said belt filtering means.

2. An apparatus as claimed in claim 1, wherein the filtering means comprises an endless filter cloth.

3. An apparatus as claimed in claim 1, wherein a reciprocally movable suction box forming part of the suction means is arranged under said belt filtering means.

4. An apparatus as claimed in claim 1, provided with control means for controlling at least one of the movement of said belt filtering means, the supply of the mixture and a suction force of the suction means.

5. An apparatus as claimed in claim 1, wherein the capacitive sensor comprises a first and a second electrode, wherein the first electrode is disposed in the area where the mixture is supplied by the feed means and wherein the second electrode extends from a position close to the feed means to a predetermined position at a distance from the feed means in a direction of movement of said belt filtering means.

6. An apparatus as claimed in claim 1, wherein the capacitive sensor comprises a first and a second electrode, wherein the first electrode is attached to a frame of the apparatus near the feed means and wherein the second electrode includes a planar member extending above and substantially parallel to an upper surface of said belt filtering means.

7. An apparatus as claimed in claim 5, wherein a reciprocally movable suction box forming part of the suction means is arranged under said belt filtering means.

8. An apparatus as claimed in claim 5, provided with control means for controlling at least one of the movement of said belt filtering means, the supply of the mixture and a suction force of the suction means.

* * * * *

UNITED STATES PATENT AND TRADEMARK OFFICE
CERTIFICATE OF CORRECTION

PATENT NO. : 5,571,404
DATED : November 5, 1996
INVENTOR(S) : Ulrich Derenthal

It is certified that error appears in the above-indentified patent and that said Letters Patent is hereby corrected as shown below:

Claim 2 Lines 12-13 Column 4 "the filtering" should read --said belt filtering--.

Signed and Sealed this

Eighteenth Day of February, 1997

Attest:

BRUCE LEHMAN

Attesting Officer

Commissioner of Patents and Trademarks